United States Patent [19]
Joo

[11] Patent Number: 6,029,706
[45] Date of Patent: Feb. 29, 2000

[54] VALVE OF A STORAGE TANK FOR TRANSPORTING OILS OR CHEMICAL COMPOUNDS

[75] Inventor: Kwang Il Joo, Kim-Hae-Si, Rep. of Korea

[73] Assignee: Korea Steel Power Co. Ltd., Kimhae-si, Rep. of Korea

[21] Appl. No.: 09/159,796

[22] Filed: Sep. 24, 1998

[30] Foreign Application Priority Data

Aug. 28, 1998 [KR] Rep. of Korea ........................ 98-16471

[51] Int. Cl.[7] .................................................. F16K 24/00
[52] U.S. Cl. ................. 137/862; 137/484.4; 137/533.31; 137/514.5; 137/522; 137/493.8
[58] Field of Search .............................. 137/493.8, 493.9, 137/484.4, 533.31, 526, 514.5, 522, 220

[56] References Cited

FOREIGN PATENT DOCUMENTS 0125817   6/1998   Rep. of Korea .

Primary Examiner—Charles R. Eloshway
Attorney, Agent, or Firm—Notaro & Michalos P.C.

[57] ABSTRACT

A valve of a storage tank for transporting oils or chemical compounds avoids problems caused by crossing a suction path for external air with a pathway for outputting volatile gases from the storage tank. The valve includes an upper body having a circular inclined hole formed at its top surface; a lower body with an enforcing frame, a circular flange and connection bars; a stem formed at the bottom of the inclined hole at which a screw and a sleeve-shaped rod are formed; a disc having a boss supported by several enforcing spokes; a circular auxiliary plate connected to the screw of the stem; a bushing supporting a weight laid on top of the auxiliary plate; a lock nut fixing the auxiliary plate to the screw of the stem; and a cap having a hole into which the sleeve-shaped rod of the stem can be inserted and another hole in the cap connected to the first hole in the cap.

8 Claims, 4 Drawing Sheets

VALVE OF A STORAGE TANK FOR TRANSPORTING OILS OR CHEMICAL COMPOUNDS

BACKGROUND OF THE INVENTION

1. Field of the Invention

The present invention is related to a valve of a storage tank for transporting oils or chemical compounds. In more detail, the present invention is related to a valve for maintaining the pressure state of the above storage tank to be always safe by preventing supersaturated pressure or negative pressure, which is the opposite phenomenon of supersaturated pressure, generated in the storage tank of transportation vessels such as an oil tanker. The valve in the present invention also prevents entering of flame generated outside of the storage tank into the storage tank.

2. Description of the Prior Art

Usually, supersaturated pressure and negative pressure (vacuum phenomenon) are generated frequently in storage tanks keeping various oils or chemical compounds. That is, it is possible that the pressure in a storage tank is increased by volatile gases from various oils or chemical compounds stored in the storage tank, however, pressure may be varied according to the change in temperature due to the difference in climate occurring in each district where an oil tanker or a transportation vessel of chemical compounds sails. In almost all such cases, supersaturated pressure is generated. And if an oil or chemical compound is discharged from the storage tank by pumping, the pressure is lowered in the storage tank and negative pressure (vacuum phenomenon) is generated.

If the pressure is changed in a closed space, not only oils or chemical compounds which are highly explosive and inflammable become unstable, but also there is a high probability that explosion or fire will occur, and it is possible to have a serious accident if the above storage tank is exploded. Therefore, every storage tank keeping oils or chemical compounds is subject to be equipped with vent pipes which are connected to outside at all times. However, since these vent pipes are always open, a large amount of oils or chemical compounds are evaporated through them. This eventually implies economical loss as well as contaminating air.

There have been a few inventions to resolve the above-identified problems. They include Korean Utility Model Registration No. 125817 entitled "A valve gear for absorbing or discharging air of a transportation tank of oils or chemical compounds" owned by the applicant of the present invention, and U.S. Pat. No. 5,060,688. However, in these inventions, the suction means of external air or storage tank and the discharging means of expanded gases which discharges volatile gases from the storage tank are separated from each other crossing at a right angle and are connected to each other by means of other connection pipes. They are therefore disadvantageous in that they occupy a large installation space. Also, there is a problem of increasing the weight of a vessel if the above conventional equipments are installed at a transportation vessel since their own weights are considerable. Since more than tens of these equipments are to be installed at one vessel, their weights are not insignificant. Further, it has been inconvenient to repair them since their manufacture and assembling take a long time in terms of processing, their unit prices are increased, and their structures are unreasonably complicated. Still further, it has been difficult to clean foreign materials which are fixed inside of the equipment as it is used.

SUMMARY OF THE INVENTION

It is therefore an object of this invention to provide a valve gear of a storage tank for transporting oils or chemical compounds by preventing supersaturated pressure and negative pressure generated inside of a storage tank of a transportation vessel moving oils or chemical compounds such as an oil tanker and maintaining safe pressure at all times.

Another object of the present invention is to provide a valve gear for a storage tank for transporting oils or chemical compounds which is not installed while maintaining a distance between the suction means of external air and discharging means of expanded gases and occupying a large space, but is composed compactly on the identical longitudinal center.

Still another object of the present invention is to provide a valve gear of a storage tank for transporting oils or chemical compounds, of which manufacturing unit price is low since its size is compact and of which installation and repair are convenient.

Further still another object of the present invention is to provide a valve gear of a storage tank for transporting oils or chemical compounds, of which internal cleaning is possible by hot steam, and through which condensed water generated inside of the equipment (water formed by dew formation phenomenon) enters into the storage tank.

An equipment in the present invention to achieve the above-described objects is characterized by being composed of an upper body having a circular inclined hole formed at its top surface; a lower body connected by an enforcing frame, around which a circular flange is formed, and connection spokes as an entity; a stem formed at the bottom of the inclined portion at which a screw portion and a sleeve-shaped rod portion are formed; a disc having a boss supported by several enforcing spokes; a circular auxiliary plate assembled to the screw portion of the stem; a bushing supporting a weight by being laid on top of the above auxiliary plate; a lock nut fixing the above auxiliary plate to the screw portion of the stem; and a cap having a hole into which the sleeve-shaped rod portion of the stem can be inserted and another hole which is connected to the above hole.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
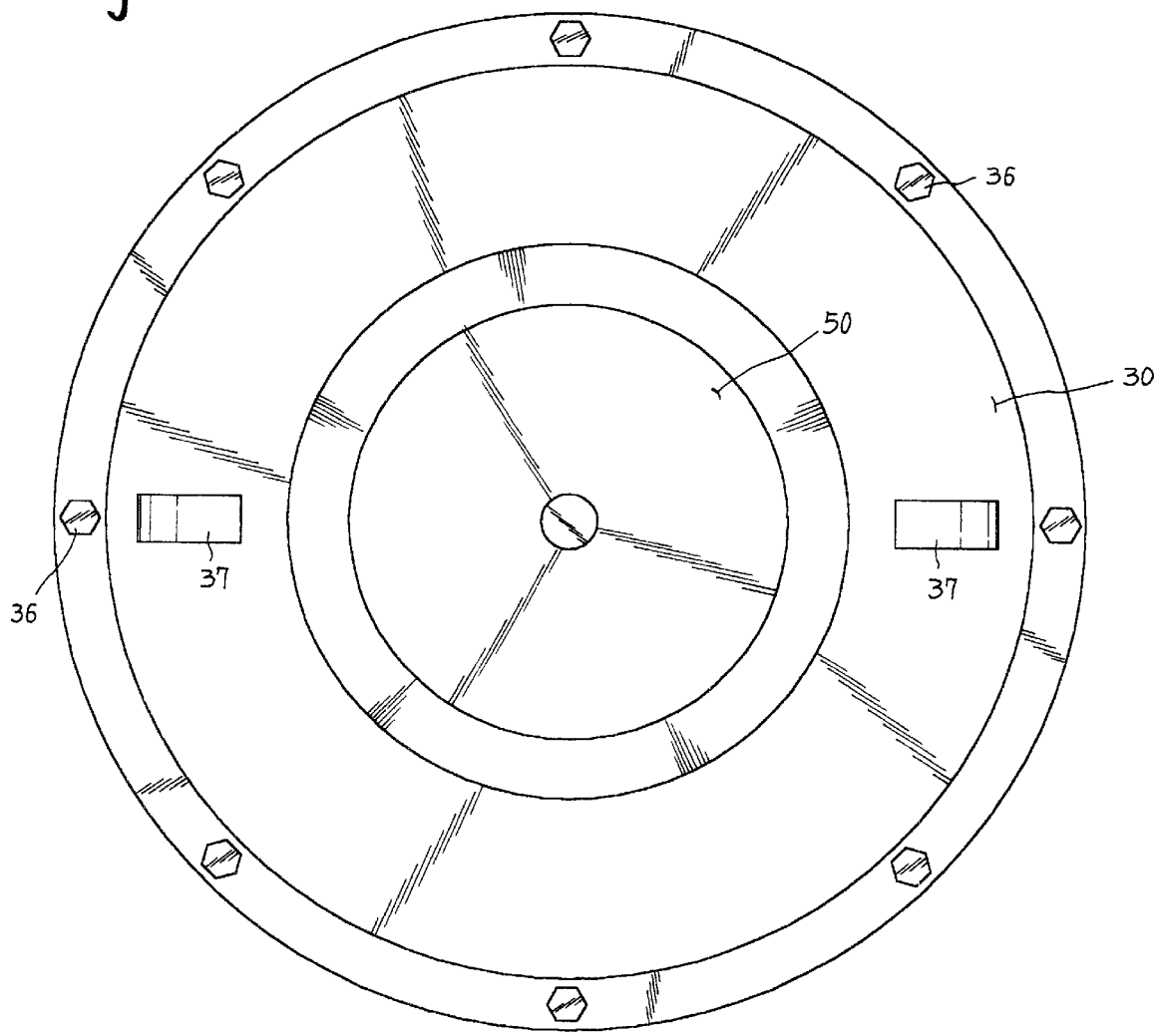
FIG. 1 is a plan view of a valve gear or valve according to a preferred embodiment of the present invention.

Referring now to the drawings, there is showing a process of manufacturing a valve in the present invention.

Figure 2:
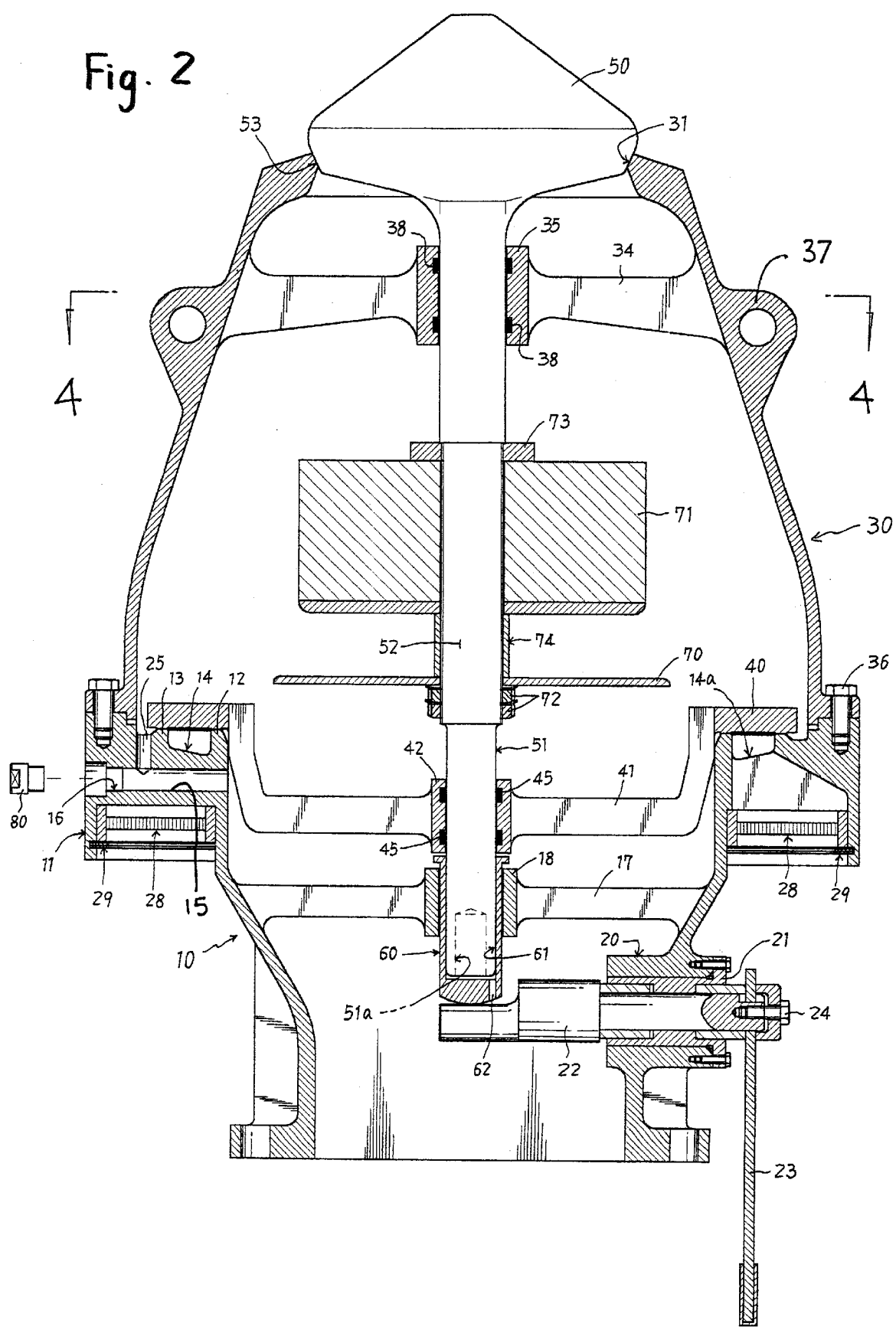
FIG. 2 is a cross-sectional view showing the structure of the valve gear in the present invention.
Figure 3:
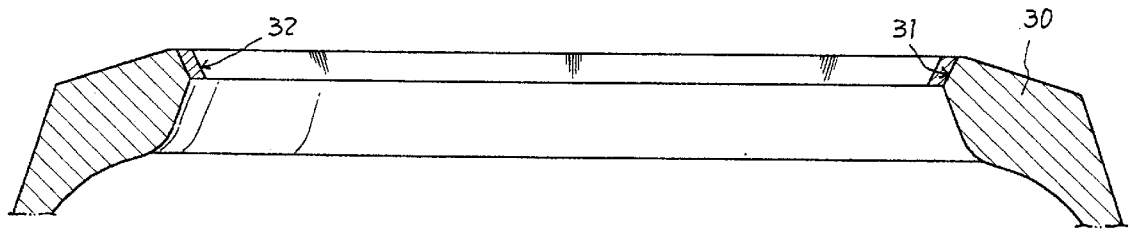
FIG. 3 is a cross-sectional view showing an enlarged portion of a part of the upper body.
Figure 4:
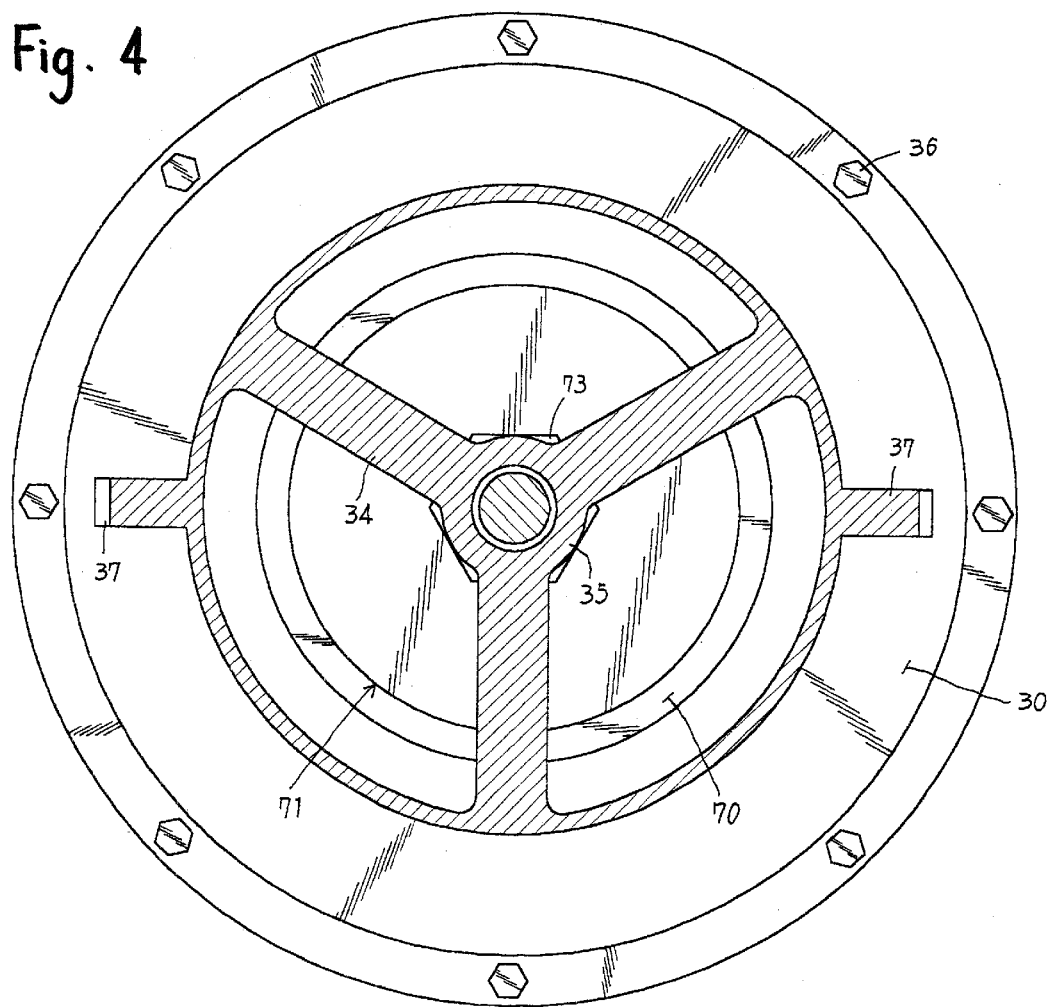
FIG. 4 is a cross-sectional view of the valve gear in FIG. 2 along the 4—4 line.

FIG. 1 is a plan view of a valve gear in the present invention showing bolts 36 for assembling an upper body 30 in the form of a circular cone from which a conical stem 50 is exposed externally, and a lower body 10 in the form of a cylinder including an enforcing frame 11. Ears 37 on upper body 30 have fastening holes therethrough (FIG. 2). However, it is possible that the stem 50 and upper body 30 are manufactured not always in the form of a circular cone but also in the form of a cylinder.

Figure 5:
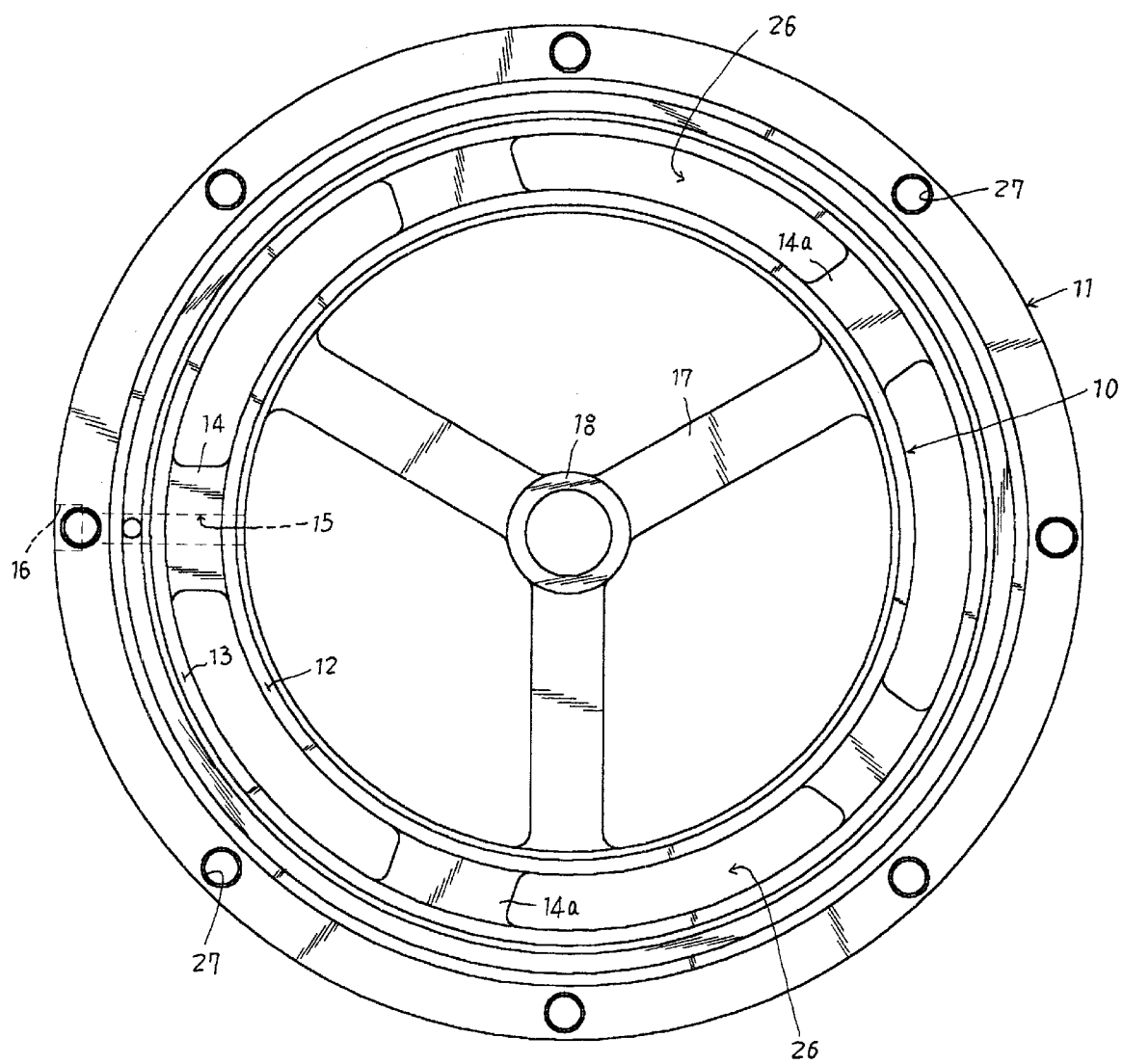
FIG. 5 is a plan view of only the lower portion of the valve gear in the present invention.

FIG. 2 shows the entire structure of the present invention. To the external frame direction of the lower body 10, the enforcing frame 11 is connected as an entity by connection bars, ribs or spokes 14 and 14a. The lower body 10 is made of a casting, which is the same for the upper body 30 and disc 40. Formed inside of the enforcing frame 11 is a flange 12, having a horizontal upper surface aligned with a flange 13 of the lower body. These upper surfaces are ground smoothly by grinding. The bottom surface of a disc 40 which is to be described below is also ground smooth. Between the enforcing frame and lower body, a usual reverse-flow-prevention filter 28 is inserted, which is fixed by a snap ring 29. There are several enforcing irons or spokes 17 inside of the lower body, at which center a boss 18 is formed, into which a cap 60 is inserted, into which a sleeve-shaped rod portion 51 of the stem 50 is inserted. A pathway 26 for flowing external air into the equipment is formed between the above connection bars 14 and 14a. Again, a horizontal boss 20 is formed as an entity horizontally at the side of the lower body, into which a bushing 21 is inserted, and an eccentric axis 22 is inserted in the bushing 21. Connected to the upper surface of the eccentric axis 22 is the bottom surface of the above cap 60, which is turned and lifted up if a handle 23 is turned forcefully by the rotation of the eccentric axis 22. The stem 50 is then lifted up, and an inclined portion 53 of the stem closing an inclined hole 31 of the upper body 30 opens the hole 31. At this time, the disc 40 is also a little lifted up along with the stem and external air flows inside of the valve gear. That is, the eccentric axis 22 and the handle 23 are installed as a preventive measure for normal operation of the valve gear by preventing rusting when it is not used for a long time. If the eccentric axis 22 returned to its original position, the stem and disc return to their original positions as well. As shown in FIGS. 2 and 5, a hole 15 which penetrates through the inner space of the lower body is formed at one connection iron 14, and a hole 25 which penetrates through the above 15 vertically is formed at the external side of the board 13. A screw portion 16 is formed at the end of hole 15 so that a cock 80 can be inserted. The hole 15 is used as follows: A long-time use of the valve gear in the present invention lets particles and gases which are evaporated in the storage tank, dust, foreign materials contained in water vapor, etc. attach to inner surfaces of the upper and lower bodies as well as surfaces and cleaves of the disc, stem, cap 60, etc. Accordingly, the equipment does not operate smoothly. An equipment in the present invention is proper for removing the above foreign materials, etc. by loosening the cock 80 and inputting high-temperature and high-pressure water vapor into the hole 15. The hole 25 is used as follows: water vapor which is evaporated from inside of the storage tank forms water drops as it is condensed inside of the upper body, which then flows along the inner surface of the upper body. The condensed water flowed then enters into the hole 15 through the hole 25, flows down into the lower body, and falls down into the storage tank. As the condensed water falls down again into the storage tank although condensed water due to water vapor is generated, there occurs no problem due to condensed water.

As shown in FIG. 2, enforcing irons 41 are formed at the disc 40, and a boss 42 is formed at the center of enforcing irons 41, in order to support the ring-type rod portion 51 of the stem. Insertion of the ring-type rod 51 of the stem into the boss 42 enables precise operation of the equipment when the disc 40 moves up and down, at which time a Teflon ring 45 assumes a role of a lubricant. The bottom surface of the disc 40 is connected to the board 12 of the enforcing frame and the board 13 of the lower body to maintain air-tightness.

An inclined hole 31 is formed at the upper surface of the upper body 30. It is desirable to have about 40–50° for the degree of its inclination, and it should be processed precisely. A highly friction-proof cobalt coating layer 32 is formed on the surface of the inclined hole 31. The proper thickness of the coating is within 0.5–1.0 mm. Because of this cobalt coating layer thus formed, air-tightness is not lowered although there are frequent contacts with the inclined portion 53 of the stem. Several enforcing irons or spokes 34 are also formed at the inner center of the upper body, at which center, a boss 35 is formed as an entity. It is natural that pathways are formed among the above enforcing irons 34. The Teflon ring 38 is inserted in the above boss 35 as in the case of a disc, thus facilitating the up-and-down movement of the stem. And the upper body 30 and the lower body 10 are assembled by the bolts 36. Therefore, a valve gear in the present invention is largely divided into two equal parts, and the longitudinal center of the stem 50 and that of the upper body 30 and the lower body 10 are in conformity with each other.

At the lower side of the stem 50, there is a head portion having the inclined portion 53. Further below that at the extended rod, a screw portion 52 and a sleeve-shaped rod portion 51 are formed. At this time at the bottom surface of the sleeve-shaped rod portion, a hole 51a having a predetermined depth is formed. It is desirable to make the degree of inclination of the inclined portion 53 be the same as that of the inclined hole 31 of the upper body. An auxiliary plate 70 fixed by a lock nut 72 is installed at the screw portion of the stem, and a bushing 74 is assembled at the upper surface of the auxiliary plate 70. Laid on top of the bushing 74 is a weight 71 weighing according to the international regulations of law provisions related to vessels, and this weight is fixed solidly by a nut 73. As the stem is pressed by the weight of a weight, the inclined portion 53 closes the inclined hole 31 at all times.

Formed inside of a cap 60 is a hole 61 into which the rod portion 51 of the stem is inserted. Impact, vibration, hammering phenomenon, fluttering phenomenon, etc. due to discharge of supersaturated gases generated inside of the storage tank can be almost extinguished when the stem moves up and down by having gases circulate through another hole 62. That is, supersaturated pressure is generated in the storage tank, and if gases are to be discharged externally, they can be discharged outside through the inclined hole while lifting up the stem, but inside of the hole 61 and inside of the hole 51a of the ring-type portion 51 are pressurized through the hole 62. Here, the depth of the hole 51a can be a few centimeters or a little deeper, but this can be adjusted properly when designing the valve gear in the present invention. In the meantime, the auxiliary plate 70 assists elevation action of the stem as a wing of an airplane due to the affect of supersaturated gases discharged. In other words, as the stem is lifted up, the rod portion 51 is also lifted while creating a space proportional to the length of elevation at the bottom surface of the ring-type rod portion in the cap 60. Whereas, the pressure of supersaturated gases discharged is acted upon this space and in the hole 51a of the ring-type rod portion. By such action, buffering is accomplished at the bottom of the ring-type rod portion 51 and inside of the cap 60, and therefore, up-and-down vibration of the stem, hammering phenomenon, fluttering phenomenon, etc. are almost extinguished when supersaturated gases are discharged, and the non-hammering results are obtained. It is natural that the auxiliary plate 70 contributes to the non-hammering action. It is most desirable and ideal for a valve gear such as one in the present invention not to hammer when it is operated. Thereafter, when the stem is lowered by the weight of a weight as the supersaturated pressure is somewhat relieved, the bottom surface of the ring-type rod portion 51 is descended smoothly while discharging gases in the cap 60 through the hole 62. Accordingly, impact according to lowering of the stem is greatly alleviated. The auxiliary plate 70 assists smooth lowering of the stem at this time as well. Therefore, the cap 60 and auxiliary board 70 plan an important role of greatly increasing durability of the equipment. If supersaturated pressure is generated in the storage tank again, as illustrated in the above, gases are discharged, the stem is lowered, and the inclined portion 53 of the stem closes the second inclined hole 31. Accordingly, the up-and-down movement of the stem is repeated non-specifically.

Next, if oils or chemical compounds in the storage tank are discharged outside (to a tank on the ground or a storage tank of another vessel) by pumping, they are discharged rapidly thus generating negative pressure (vacuum phenomenon) in the storage tank. Therefore, discharge of oils or chemical compounds is not facilitated. If this phenomena becomes severe, it is possible that the storage tank is crushed or cracks are formed at the welding portion or weak portion. And it is not good for a storage tank if supersaturated pressure is generated or if negative pressure is generated. Therefore, if negative pressure is generated, it is desirable to maintain the standard pressure in the storage tank at all times by having external air enter into the storage tank, and it is safe to keep this state.

If negative pressure is generated in the storage tank, naturally it acts upon inner spaces of the upper body 30 and lower body 10. The disc 40 is then lifted up a little by the pressure of external air. Therefore, external air flows into the storage tank through the pathway 26 after foreign materials are filtered through the reverse-flow-preventing filter 28 thus relieving negative pressure in the storage tank. If negative pressure is relieved somewhat, the disc 40 returns to its original position naturally again and cuts off flowing-in of external air as the inner pressure of the storage tank and atmospheric pressure become almost balanced. The reverse-flow-preventing filter 28 not only assumes a role of filtering foreign materials mixed in the air flowing in the storage tank somewhat, but also prevents entering of flame or source of heat generated externally.

It is seen that the size and weight of a valve gear in the present invention are reduced by about 30% compared to a conventional equipment under the conditions of demonstrating identical functions, and durability is increased by about 30% also.

As reviewed in the above, a valve gear in the present invention has an effect of facilitating discharge of gases or flowing-in of external air compared to conventional equipments by compacting the upper body and lower body so that their axes and longitudinal centers are in conformity with each other. Its structural characteristics bring in advantages in that the number of large-sized parts is small and its assembling and repair are convenient, thus leading eventually to be highly economic in that the production unit cost is reduced and the time required for its installation is shortened. The equipment in the present invention is characterized by its small size thus occupying a small space, and particularly, its light weight is effective in reducing the inherent weight of a vessel if it is installed at a ship. It is also advantageous in that inside of the equipment can be cleaned simply by high-temperature and high-pressure water vapor, and the condensed water formed by water vapor evaporated in the storage tank can be restored into the storage tank again. It is further characterized by its increased durability by inducing the non-hammering action by very effectively relieving the hammering phenomenon, fluttering phenomenon, vibration, impact, etc. of the stem generated when gases are discharged due to supersaturated pressure.

While the invention has been described in terms of a single preferred embodiment, those skilled in the art will recognize that the invention can be practiced with modification within the spirit and scope of the appended claims.

What is claimed is:

1. A valve for a storage tank for transporting oils or chemical compounds, comprising:

an upper body having a circular inclined hole formed at an upper end of the upper body;

a lower body having an enforcing frame connected to the upper body, the enforcing frame including a plurality of enforcing frame spokes connected to at least one circular flange spaced from the enforcing frame to define a pathway therebetween, the pathway communicating an exterior of the valve to an interior of the valve, a lower body boss and a plurality of spokes connected between the lower body boss and the circular flange;

a stem having a lower inclined portion engagable against the inclined hole of the upper body for opening and closing the hole with upward and downward movement of the stem, the stem having a screw portion and a sleeve-shaped rod portion, the stem being supported in the valve for upward and downward movement;

a disc assembly having a disc for resting on the circular flange for closing the pathway and movable upwardly for opening the pathway, the disc assembly including a disc assembly boss and a plurality of spokes connected between the disc and the disc assembly boss, the disc assembly boss being mounted on the stem for upward and downward movement of the disc assembly;

a circular auxiliary plate engaged to the screw portion of the stem and extending in the valve;

a weight with bushing engaged on the auxiliary plate;

a lock nut engaged to the screw portion of the stem for fixing the auxiliary plate to the stem; and a cap engaged in the lower body boss, the cap including a first hole for receiving the sleeve-shaped rod portion of the stem for upward and downward movement of the stem, the cap including a second hole communicating with the first hole for admitting air to allow the stem to rise with respect to the cap.

2. A valve according to claim 1, including a cobalt coating layer on the inclined hole of the upper body.

3. A valve according to claim 1, wherein the upper body, the lower body and the stem have aligned vertically extending central axes.

4. A valve according to claim 1, including a reverse-flow-preventing filter in the pathway.

5. A valve according to claim 1, including a horizontal boss in the lower body and an eccentric shaft rotatably mounted in the horizontal boss and engaged with a lower end of the stem for raising and lowering the stem with rotation of the eccentric shaft.

6. A valve according to claim 1, including a first hole in at least one of the spokes of the enforcing frame of the lower body for communicating an interior of the lower body with an exterior of the lower body, a second hole in the at least one spoke communicating with the first hole in the at least one spoke, the second hole extending toward the upper body, and a stop cock engagable with the first hole for opening and closing the first hole to admit cleansing fluid into the valve.

7. A valve according to claim 1, wherein the upper body includes an outer housing portion and an inner boss with a plurality of spokes connected between the outer housing portion and the inner boss, at least one ring in the inner boss, the stem slidably mounted in the inner boss along the ring for upward and downward movement of the stem.

8. A valve according to claim 1, wherein the sleeve-shaped rod portion of the stem includes a further hole communicating with the first hole in the cap.

* * * * *